United States Patent [19]

Frazier

[11] 4,249,604
[45] Feb. 10, 1981

[54] RECOVERY METHOD FOR HIGH VISCOSITY PETROLEUM

[75] Inventor: Terry L. Frazier, Houston, Tex.

[73] Assignee: Texaco Inc., White Plains, N.Y.

[21] Appl. No.: 41,836

[22] Filed: May 23, 1979

[51] Int. Cl.$^3$ .................... E21B 43/24; E21B 43/30
[52] U.S. Cl. .................................. 166/263; 166/272
[58] Field of Search ............... 166/272, 268, 52, 263, 166/50, 245; 175/61, 62

[56] References Cited

U.S. PATENT DOCUMENTS

| | | | |
|---|---|---|---|
| 3,153,448 | 10/1964 | Dew et al. | 166/245 |
| 3,731,741 | 5/1973 | Palmer et al. | 166/272 |
| 3,732,926 | 5/1973 | Brown et al. | 166/272 |
| 3,860,597 | 1/1975 | Palmer et al. | 166/272 X |
| 3,960,213 | 6/1976 | Striegler et al. | 166/50 X |
| 3,994,340 | 11/1976 | Anderson et al. | 166/50 X |
| 4,022,279 | 5/1977 | Driver | 166/272 X |
| 4,043,922 | 8/1977 | Palmer et al. | 166/272 X |
| 4,062,404 | 12/1977 | Pasini et al. | 166/50 X |
| 4,160,481 | 7/1979 | Turk et al. | 166/50 X |

*Primary Examiner*—Stephen J. Novosad
*Attorney, Agent, or Firm*—Carl G. Ries; Robert A. Kulason; Jack H. Park

[57] ABSTRACT

High viscosity petroleum, such as heavy oils and tar, is recovered by first drilling a number of production wells in a conventional pattern, then drilling a plurality directionally drilled injection wells extending radially inward toward each producing well, such that the surface location of each injection well is not less than the normal spacing between production wells, and the bottom hole location approaches the production well closely enough that fluid communication between the two wells can be established by the injection of heated fluids into the injection well. The petroleum is then recovered from the producing well by conventional thermal means.

15 Claims, No Drawings

RECOVERY METHOD FOR HIGH VISCOSITY PETROLEUM

BACKGROUND OF THE INVENTION

1. Field of the Invention

This invention relates to a method for recovering high viscosity petroleum from an underground reservoir. More specifically, the invention relates to oil recovery methods wherein heated aqueous fluids are injected into directionally drilled injection wells which are drilled radially inward towards a central producing well, the bottom hole location of said injection well being substantially less than the normal spacing between a conventional pattern of producing wells and the surface location being not less than the normal spacing interval between production wells.

2. Description of the Prior Art

A great many subterranean petroleum deposits contain petroleum of such a high viscosity that production of this petroleum by primary recovery techniques is impracticable, if not impossible. Indeed, two of the world's largest petroleum accumulations, the vast tar sand deposits in western Canada and Venezuela, remain essentially untapped because of the high viscosity of the petroleum contained therein. In order to successfully recover this kind of petroleum, at least three objectives must be achieved. First, fluid flow communication must be established between injection and producing wells. Second, the viscosity of the petroleum must be reduced to a level sufficient to allow flow of the petroleum through the reservoir, and third, the recovery method must be able to act upon a large portion of the pore volume of the reservoir.

Thermal oil recovery methods such as in situ combustion and steam flooding have been shown to be effective in mobilizing the hydrocarbons in high viscosity petroleum reservoirs. Steam flooding has enjoyed increasing popularity in recent years and is the most commercially successful of the thermal oil recovery techniques. Steam flooding can be utilized in a single well by the so called "huff-and-puff" technique. This method involves first injecting steam into a well, then shutting in the well for a "soak" period wherein the heat contained in the steam raises the temperature and lowers the viscosity of the petroleum, and then a production period wherein the mobilized petroleum is produced from the well, usually by pumping. Steam flooding may also be utilized as a steam drive or steam through-put process, wherein steam is injected into the reservoir through one or more injection wells. This steam then moves through the subterranean reservoir mobilizing and volatilizing the petroleum it encounters. This steam-flood front moves through the reservoir towards the production wells, wherefrom the petroleum fluids are produced. The steam drive process is more effective than the "huff-and-puff" method inasmuch as the potential volume of the reservoir which can be swept by process is much greater.

Although the steam drive process is very effective in recovering petroleum from the portions of the reservoir through which the steam actually sweeps, in practice, the success of the steam drive method is often poor because of the process' inability to develop fluid communication and because of low vertical conformance efficiency. Establishment of fluid communication between injection and production wells is especially difficult in these high viscosity petroleum reservoirs. Low vertical fracture pressures in many reservoirs prevent the use of high pressures during the injection process. Also in thermal recovery methods the heated and mobilized petroleum will form banks at the leading edge of the thermal flood. If such a bank progresses through the formation to a point far enough away from the injection well that there is no longer sufficient heat and pressure to propagate its continued flow, the bank will cool and solidify into an impermeable barrier to further fluid flow. The major cause of the poor vertical conformance, which is a measure of the portion of the reservoir swept by the process, is the fact that steam, having a lower density than the other fluids present in the reservoir, will tend to migrate to the upper portions of the reservoir, forming channels across the top of the reservoir to the production well. Once these steam channels have formed in the upper portion of the reservoir, the permeability of these zones is increased due to the continued action of the steam upon the formation and subsequent removal of petroleum. In this manner, more and more steam will flow through these high permeability channels directly to the production wells, leaving the great majority of the reservoir essentially untouched by the steam drive process. It is typical that less than 50 percent of the petroleum contained within the formation can be recovered by the steam drive process leaving large amounts of petroleum within the reservoir after the completion of the process. The severity of this vertical conformance problem increases with the thickness of the oil reservoir and with the viscosity of the petroleum contained within the reservoir.

As it can be seen in the above discussion, there remains a substantial need for a steam drive process that can develop fluid communication under adverse conditions and that exhibits improved vertical conformance efficiency resulting in substantial increases in petroleum recovery.

SUMMARY OF THE INVENTION

This invention relates to a method for recovering petroleum from a subterranean reservoir that contains heavy high viscosity petroleum deposits. In this method a plurality of production wells arrayed in a standard pattern with normal spacing between production wells is utilized, each production well being surrounded by a plurality of directionally drilled injection wells which extend radially inwards toward each production well. The injection wells are drilled to a position substantially at the basal surface of the subterranean reservoir and the bottom most producing interval in the production well is also located at or near the bottom surface of the reservoir. Interwell fluid communication is established between the injection wells and the production well by a first period of injection of hot aqueous fluids into both injection wells and production wells, followed by a shut-in period sufficient for the formation temperature to be raised and the petroleum contained therein to be mobilized, followed by a third period wherein the heated aqueous fluid is injected in a through-put process into the injection wells through the formation and out through the production well. In many instances, the through-put process can be initiated directly if the pressure drop between the injection well and the production well is sufficiently low. In any case the interwell fluid communication is readily established due to the close proximity of the injection and production intervals. This proximity enables fluid mobilization to take place in reservoirs that would be essentially non-producible under normal thermal flooding operations and is due to the unique geometry employed herein by the directionally drilled wells.

Once interwell communication is established between the injection wells and the centrally located production well, both the injection and production intervals can be raised by either raising the perforated intervals in the wells or by utilizing a "sliding sleeve" arrangement within the wells. By this method, a greatly increased portion of the subterranean reservoir can be swept by the injected heated aqueous solution resulting in substantially increased petroleum production when compared to normal recovery operations utilizing vertically drilled injection and production wells.

DESCRIPTION OF THE PREFERRED EMBODIMENTS

The art is replete with methods for the recovery of high viscosity petroleum deposits, particularly tar from tar sands in subterranean reservoirs. As discussed above, the theoretically most efficient methods involve multi-well through-put processes, and most, if not all, of these multi-well processes require that an effective measure of interwell fluid communication be established for the methods to function effectively. Those methods which do claim to provide an effective measure of fluid communication between wells have not proven to be particularly effective in field tests, being to varying extents unreliable, slow or ineffective. The field conditions which produce these poor results are the extremely high viscosities of the petroleum at formation temperature, the low vertical fracture pressures found in most shallow deposits and the tendency of the mobilized petroleum to coalesce into banks which then cool and form an impermeable barrier.

This invention overcomes these problems by a unique method which utilizes directionally drilled injection wells to initiate fluid communication between the injection wells and a centrally located production well at a bottom hole interwell distance overwhich interwell fluid communication can be easily established at low pressures. Once such interwell fluid communication is established, the distance between the injection interval in the injection well and the producing interval in the centrally located producing well is incrementally increased by raising the injection and production intervals in the respective wells thereby increasing the swept volume of the reservoir. This method is discussed in detail below.

The production wells used to exploit the subterranean petroleum deposit can be arrayed in any conventional pattern with the interwell spacing appropriate to the particular field conditions present. Increased well density will result in increased oil recovery, but with added cost. The selection of a particular well pattern and spacing for a given petroleum deposit can be best decided upon by the experienced practitioner in the field. Means should be provided in each producing well to enable the producing interval in each well to be raised from the initial position at or near the base of the reservoir to various positions higher in the reservoir.

A plurality of injection wells surround each production well and are directionally drilled inwardly towards the producing well, terminating at the base of the petroleum reservoir and at a distance from the producing well such that interwell fluid communication can be readily established. At least two, and preferably from three to six, injection wells should be drilled for each producing well. The surface location for each injection well should be located at a distance not less than the normal spacing between producing wells from its producing well. It is preferable that the lower-most portion of the injection well be deviated from the vertical by an angle of not less than about 45°. Again, means should be provided in each injection well for raising the injection interval in steps upwardly through the petroleum reservoir in a like manner as to the producing wells.

Since the bottom-most intervals in the injection well and the centrally located producing well are separated by only a short distance, interwell fluid communication can be readily achieved. This distance separating the bottom most interval in an injection well from the producing well is preferably less than half of the normal spacing distance between production wells. In most situations, the fluid through-put process may be undertaken directly without the need for any pre-treating steps. Such a process would entail the injection of a heated aqueous fluid into the reservoir through the injection well, thereby mobilizing and pushing the petroleum to the centrally located producing well whereform the petroleum is recovered. In situations wherein fluid communication cannot be established initially due to conditions such as extremely high petroleum viscosities or very low vertical fracture pressures, pre-treating steps may be necessary. One such pre-treatment is "steam soaking" the injection wells and/or the producing well. In this process steam is injected into the formation through the well whereupon the well is shut-in allowing the formation to rise in temperature, thereby causing the viscosity of the petroleum to decrease. When the petroleum viscosity has sufficiently decreased, the low pressure through-put process can then begin. Once fluid communication is established between the injection wells and the production well, ever increasing volumes of the formation can be exposed to the action of the injected aqueous fluids by utilizing the natural tendency of the steam to rise to the top of the formation, due to its lesser density and high relative mobility and by raising the injection interval in the injection wells and the producing interval in the production well by the means provided therefor. Such means include, but are not limited to sequential plugging and re-perforation as well as "sliding sleeve" down-hole assemblies. Since the injection well is inclined upwardly away from the production well, raising the injection interval in the injection well will have the effect of increasing the distance over which the injected aqueous fluids travel from the injection well to the production well. Other techniques may be combined with the above method for the purpose of further increasing the petroleum recovery from the reservoir. In a steam injection program, the natural tendency of the injected steam to rise towards the top of the reservoir can be utilized to sweep levels of the reservoir above the injection and production intervals in the wells. Also, pressure build-up and drawdown cycles may be employed to mobilized further volumes of petroleum within the reservoir. The centrally located production well may be switched over to an injection mode with all or some of the injection wells being converted to producing wells. Other techniques known in the art of thermal recovery operations may be combined with the method of our invention to recover further volumes of high viscosity petroleum from a reservoir.

This invention contemplates the use of heated aqueous fluids to heat, mobilize and drive the petroleum through the reservoir to the production wells. Examples of these fluids are steam, hot water and steam mixed with hot water in various ratios and at various temperatures, pressures and injection rates. Certain solubilizers could be combined with the heated aqueous fluid such as quinoline, sulfonated quinoline, sulfated quinoline, nitrophenol, alkoxylated nitrophenol and sulfonyl quinoline for the purpose of increasing the efficiency of the heated aqueous fluid flooding process.

Various embodiments and modifications of this invention have been described above and further modifications will be apparent to those skilled in the art. Such modifications are included within the scope of this invention as defined by the following claims.

I claim:

1. A method of recovering petroleum from a subterranean petroleum reservoir wherein the petroleum is of such a high viscosity that the petroleum cannot be efficiently produced by conventional primary recovery techniques comprising:
   (a) completing a plurality of producing wells in a conventional pattern with normal spacing between the producing wells, wherein the lowest producing interval in a producing well is at or near the basal surface of the reservoir with means provided to raise the producing interval in at least one such well;
   (b) completing a plurality of directionally-drilled injection wells extending radially inward toward each producing well, wherein the distance between the producing well and the surface locations of the surrounding injection wells is not less than the normal distance between the producing wells and wherein the distance between the producing well and the bottom hole locations of the injection wells, terminating at the basal surface of the reservoir, is substantially less than the spacing between the producing wells and wherein means are provided to raise the injection interval in at least one such injection well;
   (c) injecting a heated aqueous fluid into the reservoir through said injection wells, thereby mobilizing the petroleum and forcing the petroleum towards the producing wells; and
   (d) producing the petroleum from the producing wells.

2. The method of claim 1 wherein the number of injection wells surrounding each production well is at least two, and preferably from three to six.

3. The method of claim 1 wherein the lower-most portion of an injection well is inclined at an angle of not less than 45° measured from vertical.

4. The method of claim 1 wherein the heated aqueous fluid comprises a fluid selected from the groups consisting of steam, hot water and combinations thereof.

5. The method of claim 4 wherein the heated aqueous fluid contains an effective amount of a solubilizer selected from the group consisting of quinoline, sulfonated quinoline, sulfated quinoline, nitrophenol, alkoxylated nitrophenol, sulfonyl quinoline and mixtures thereof.

6. The method of claim 1 wherein the bottom hole location of an injection well is separated from the producing well by a distance not more than about one-half that of the normal distance between producing wells.

7. The method of establishing interwell fluid communication in a subterranean petroleum reservoir wherein the petroleum is of such a high viscosity that interwell fluid communication cannot be established at normal production well spacing comprising:
   (a) completing a plurality of producing wells in a conventional pattern with normal spacing between the producing wells, wherein the producing interval in a producing well is at or near the basal surface of the reservoir;
   (b) completing a plurality of directionally-drilled injection wells extending radially inward toward each producing well, wherein the distance between the producing well and the surface locations of the surrounding injection wells is not less than the normal distance between the producing wells and wherein the distance between the producing well and the bottom hole locations of the injection wells, terminating at the basal surface of the reservoir, is substantially less than the spacing between the producing wells;
   (c) injecting a heated aqueous fluid into at least one of the group of wells consisting of the injection wells and the producing well, each well so injected being then shut-in for a period of time sufficient to allow the petroleum in the immediate vicinity of each such well to become heated and subject to mobilization through the process in step (d); and
   (d) establishing interwell fluid communication between the injection wells and the producing well by injecting a heated aqueous fluid into the reservoir through said injection wells, mobilizing the petroleum by the action of the fluid, forcing the fluid and the mobilized petroleum towards the producing well and thereby establishing interwell fluid communication between the injection wells and the producing well.

8. The method of establishing interwell fluid communication in a subterranean petroleum reservoir wherein the petroleum is of such a high viscosity that interwell fluid communication cannot be established with normal well spacing comprising:
   (a) completing a plurality of vertically drilled wells in a conventional pattern with normal spacing between the wells at or near the basal surface of the reservoir;
   (b) completing a plurality of directionally drilled wells extending radially inward toward each vertically drilled well, wherein the distance between the vertically drilled well and the surface location of the surrounding directionally drilled wells is not less than the distance between the vertically drilled wells and wherein the distance between the vertically drilled well and the bottom hole locations of each of the surrounding directionally drilled wells, terminating at the basal surface of the reservoir, is substantially less than the spacing between the vertically drilled wells;
   (c) injecting a heated aqueous fluid into at least one well of the group of wells consisting of a vertically drilled well and its surrounding directionally drilled wells, each well so injected being then shut-in for a period of time sufficient to allow the petroleum in the immediate vicinity of each such well to become heated and subject to mobilization through the process in step (d); and
   (d) establishing interwell fluid communication between the wells by injecting a heated aqueous fluid into at least one of the wells in each group of wells consisting of each vertically drilled well and its surrounding directionally drilled wells, mobilizing the petroleum by the action of the fluid, and producing the mobilized petroleum from at least one of the remaining wells in each group, thereby establishing interwell fluid communication within each group of wells.

9. A method of recovering petroleum from a subterranean petroleum reservoir wherein the petroleum is of such a high viscosity that the petroleum cannot be efficiently produced by conventional primary recovery techniques comprising:

(a) completing a plurality of vertically drilled wells in a conventional pattern with normal spacing between the vertically drilled wells at or near the basal surface of the reservoir;

(b) completing a plurality of directionally drilled wells extending radially inward toward each vertically drilled well, wherein the distance between the vertically drilled well and the surface locations of the surrounding directionally drilled wells is not less than the normal distance between the vertically drilled wells and wherein the distance between the vertically drilled well and the bottom hole locations of the directionally drilled wells, terminating at the basal surface of the reservoir, is substantially less than the spacing between the vertically drilled wells;

(c) injecting a heated aqeuous fluid into at least one well of the group of wells consisting of a vertically drilled well and its surrounding directionally drilled well, each well so injected being then shut-in for a period of time sufficient to allow the petroleum in the immediate vicinity of each such well to become heated and subject to mobilization through the process in step (d);

(d) injecting a heated aqueous fluid into the reservoir into at least one well of the group of wells consisting of a vertically drilled well and its surrounding directionally drilled wells, thereby mobilizing the petroleum and forcing it towards at least one of the remaining wells of the group of wells; and (e) producing the mobilized petroleum from at least one of the wells of the group of wells.

10. The method of claim 9 wherein the number of directionally drilled wells surrounding each vertically drilled well is at least two, and preferably from three to six.

11. The method of claim 9 wherein the lowermost portion of a directionally drilled well is inclined at an angle of not less than 45° measured from vertical.

12. The method of claim 9 wherein the heated aqueous fluid comprises a fluid selected from the group consisting of steam, hot water and combinations thereof.

13. The method of claim 12 wherein the heated aqueous fluid contains an effective amount of a solubilizer selected from the group consisting of quinoline, nitrophenol, alkoxylated nitrophenol, sulfonyl quinoline and mixtures thereof.

14. The method of claim 9 wherein the bottom hole location of a directionally drilled well is separated from the vertically drilled well toward which the directionally drilled well is inclined by a distance which is not more than one-half that of the normal distance between vertically drilled wells.

15. A method of recovering petroleum from a subterranean petroleum reservoir wherein the petroleum is of such a high viscosity that the petroleum cannot be efficiently produced by conventional primary recovery techniques comprising:

(a) completing a plurality of vertically drilled wells in a conventional pattern with normal spacing between the vertically drilled wells at or near the basal surface of the reservoir;

(b) completing a plurality of directionally drilled wells extending radially inward toward each vertically drilled well, wherein the distance between the vertically drilled well and the surface locations of the surrounding directionally drilled wells is not less than the normal distance between the vertically drilled wells and wherein the distance between the vertically drilled well and the bottom hole locations of the directionally drilled wells, terminating at the basal surface of the reservoir, is substantially less than the spacing between the vertically drilled wells;

(c) injecting a heated aqueous fluid into the reservoir into at least one well of the group of wells consisting of a vertically drilled well and its surrounding directionally drilled wells wherein at least one of the wells is provided with means whereby the interval in the well wherein fluid exchange between the well bore and the reservoir takes place can be raised from its initial position at the bottom of the well, thereby mobilizing the petroleum and forcing it towards at least one of the remaining wells of the group of wells; and (d) producing the mobilized petroleum from at least one of the wells of the group of wells.

* * * * *